US007275143B1

(12) United States Patent
Simeral et al.

(10) Patent No.: US 7,275,143 B1
(45) Date of Patent: Sep. 25, 2007

(54) SYSTEM, APPARATUS AND METHOD FOR AVOIDING PAGE CONFLICTS BY CHARACTERIZING ADDRESSES IN PARALLEL WITH TRANSLATIONS OF MEMORY ADDRESSES

(75) Inventors: Brad W. Simeral, San Francisco, CA (US); Sean Jeffrey Treichler, Mountain View, CA (US); David G. Reed, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 260 days.

(21) Appl. No.: 11/012,007

(22) Filed: Dec. 13, 2004

(51) Int. Cl.
G06F 12/00 (2006.01)
G06F 9/26 (2006.01)
G06F 9/34 (2006.01)
G06F 12/06 (2006.01)
G06F 21/00 (2006.01)

(52) U.S. Cl. .............................. 711/202; 711/5; 711/6; 711/200; 711/205; 711/206

(58) Field of Classification Search ................. 711/5, 711/6, 200, 202, 205, 206
See application file for complete search history.

(56) References Cited

U.S. PATENT DOCUMENTS

| | | | | |
|---|---|---|---|---|
| 5,696,924 A | * | 12/1997 | Robertson et al. | 711/202 |
| 6,340,973 B1 | * | 1/2002 | Ochiai et al. | 345/534 |
| 6,438,641 B1 | * | 8/2002 | Kanno et al. | 711/5 |
| 6,745,277 B1 | * | 6/2004 | Lee et al. | 711/5 |
| 6,772,315 B1 | * | 8/2004 | Perego | 711/207 |

OTHER PUBLICATIONS

INTEL, "Intel® 820 Chipset: 82820 Memory Controller Hub (MCH)," Datasheet, *Copyright © Intel Corporation*, Nov. 1999, Document Number: 290630-001, pp. 1-157.
INTEL, "Intel® 850 Chipset: 82850 Memory Controller Hub (MCH)," Datasheet, *Copyright © Intel Corporation*, Nov. 2000, Document Number: 290691-001, pp. 1-144.

* cited by examiner

*Primary Examiner*—Matthew Kim
*Assistant Examiner*—Michael Alsip
(74) *Attorney, Agent, or Firm*—Cooley Godward Kronish LLP

(57) ABSTRACT

A system, apparatus, and method are disclosed for controlling accesses into memory to minimize sequential accesses to the same bank of memory, at least in part, by characterizing a subset of an address in parallel with address translations associated with those accesses. In one embodiment, an exemplary memory controller can include an address translator configured to translate an address useable by a processor to a first memory address. Also, the memory controller includes a bit characterizer configured to characterize a subset of the address as having a value from a range of values, and a bank separator coupled to the address translator and the bit characterizer for receiving a first portion of the first memory address and the value, respectively. Accordingly, the bank separator is configured to differentiate the first portion from a second portion of a second memory address.

16 Claims, 7 Drawing Sheets

US 7,275,143 B1

SYSTEM, APPARATUS AND METHOD FOR AVOIDING PAGE CONFLICTS BY CHARACTERIZING ADDRESSES IN PARALLEL WITH TRANSLATIONS OF MEMORY ADDRESSES

BRIEF DESCRIPTION OF THE INVENTION

This invention relates generally to computing systems and their memory, and more particularly, to minimizing sequential accesses to the same bank of memory, at least in part, by characterizing a subset of an address in parallel with address translations associated with those accesses.

BACKGROUND OF THE INVENTION

Some memories have inherent limitations in the rate at which data is accessed. For example, if a memory is implemented as a system memory that interfaces with one or more processors as well as one or more cache memories, the inherent limitations introduce latency that hinders processor performance. One such limitation is the requisite minimum time that must elapse before a processor can sequentially access different rows of the same bank. FIG. 1 is a timing diagram 100 showing that the requisite minimum time introduces latency when two transactions sequentially access a single bank, as is common in conventional memories. A single bank, "Bank[0]," is shown to be subject to two separate transactions, each causing access to different rows in memory (e.g., system memory). Typically, a memory controller (not shown) manages the timing of transactions such as these. A transaction ("T1") 104 requires that an activation signal ("A") 102 cause Row[i] to open so that the memory controller can access that particular row. But before the controller opens another row, Row[j], to accommodate a subsequent transaction, ("T2") 110, the memory controller issues a precharge signal ("P") 106 to close the preceding row before issuing another activation signal ("A") 108. The requisite minimum time between the openings of different rows of the same bank is depicted as "L1." So for every such pair of transactions (or "transaction pair"), a duration of L1 introduces latency in servicing processor requests.

FIG. 2 illustrates that the nature of translating a linear address into a row-column-bank ("RCB") address during which a number of transaction pairs can be generated. A typical processor contains cache memories that are accessed using a linear address 202, which is usually composed of bit groupings arranged as a tag 202a, a set 202b, and an index 202c. An example of such an address format for a specific 64-bit processor shows tag 202a spanning bits b18 through b63 and both set 202b and index 202c spanning bits b6 through 17. Address translation converts linear address 202 into an RCB address 204 having bit groupings arranged as a row, which includes bits b12 through b34 (as both row 204a and row' 204b), bits b10 and b11 (shown as "b[11:10]" representing a bank 204c), and bits b0 through b9 (as a column 204d).

During execution of program instructions, a processor frequently employs linear addresses 202 in its requests in a manner that causes lower order bits 214 (i.e., row' 204b, bank 204c and column 204d) to remain substantially the same over sequentially accessed addresses. As processors typically use lower order bits 214 as an index into cache memory to access similarly-located elements, an access request by a processor to place an element in the cache can conflict with another element that is already present at that location. This phenomenon, which can be referred to as "aliasing," causes like elements with substantially similar lower order bits to be read into and written from a cache. Aliasing exacerbates latency by generating an increased number of "page conflicts," each of which occur when a pair of transactions causes a memory controller to access different rows of the same bank of memory when bits of bank 204c are the same (i.e., indicative of the same bank). For example, consider that a processor first requests a read transaction, which is immediately followed by a processor request for a write transaction, both of which affect the same entry in cache memory. In cases where a memory operates in conjunction with a write-back, read/write allocate cache, the write transaction will cause data in that entry to be evicted (i.e., forced out) to permit the data returned from the read transaction to be stored at that same entry. And since most modern processors often generate transactions in read/write cycle pairs to different rows of the same bank, each read/write cycle pair can generate a page conflict, thereby giving rise to a corresponding amount of latency, L1, such as exemplified in FIG. 1. For instance, transactions T1 and T2 can respectively be consecutive read and write transactions that traditionally lead to page conflicts.

FIG. 3 is a block diagram illustrating an approach to reducing latency due to sequential accesses to memory that result in page conflicts. In this approach, a mechanism for minimizing page conflicts is implemented during address translation (i.e., after a linear address is translated, but before a RCB address is applied to the memory). As shown, a conventional system 300 using RCB address translation includes a processor 302, a memory controller 308, and a memory 322 as system memory. Memory controller 308 contains an address translator 310 to convert linear address 306 into an RCB-formatted address, such as RCB address 320. To reduce page conflicts, memory controller 308 includes a row characterizer 312 and a bank separator 314. Row characterizer 312 operates on upper order bits 212 to characterize these bits for each RCB address 320. Namely, row characterizer 312 characterizes each incoming access request to avoid situations giving rise to page conflicts, such as when a subsequent address has identical lower bits 214 to an adjacent, preceding address even though upper order bits 212 for both addresses are different. The characterizations of upper order bits 212 are such that memory controller 308 operates to modify RCB address 320 likely to have identical lower order bits 214 so that sequential accesses will generally be to different banks rather than to a common bank of memory. To differentiate the banks, row characterizer 312 first sends the characterizations of upper order bits 212 for the translated addresses to bank separator 314.

Based upon the characterization of the upper order bits 212, as well as translated bank bits 204c, bank separator 314 generates new bank bits for substitution into RCB address 320. The new bank bits for each RCB address 320 are such that the sequential accesses generally relate to different banks, rather than the same bank. By accessing different banks, memory controller 308 avoids latency due to requisite minimum time, L1. Note that path 316 provides new bank bits, whereas path 318 provides translated row and column bits to form RCB address 320. Memory controller 308 has been implemented in the NVIDIA nForce™2 chipset, which is manufactured by NVIDIA Corporation of Santa Clara, Calif.

FIG. 4 is a timing diagram 400 showing sequential accesses to different banks as translated by memory controller 308. A first bank, "Bank[0]," is subject to a preceding transaction ("T1") 404. Transaction 404 requires that an activation signal ("A") 402 cause a row in memory 322 to open so that memory controller 308 can access that particular row. To accommodate a subsequent transaction, ("T2") 408, memory controller 308 issues another activation signal ("A") 406 to cause another row to open in as second bank, "Bank[1]," rather than Bank[0]. Accordingly, a subsequent transaction ("T2") 408 can proceed in less than the requisite minimum time, L1. As shown, transaction ("T2") 408 can occur after time, L2, which is less than L1. Further, as different banks are being used, other transactions Tx 412 and Ty 414 can access the memory without requiring a pre-charged by signal ("P") 106, such as shown in FIG. 1. In some cases, Bank[0] and Bank[1] can alternately provide for subsequent read transactions (e.g., such as Tx 412) and subsequent write transactions (e.g., such as Ty 414), respectively, for read-write cycle pairs that typically are issued by processor 302.

Although memory controller 308 does reduce latency, there are several drawbacks in the implementation of memory controller 308. First, row characterizer 312 is in series with address translator 310. As such, row characterizer 312 depends on receiving translated row bits to perform its functionality. Second, with row characterizer 312 in series with address translator 310, three stages are required to generate RCB addresses 320. A critical path is shown as a heavy line passing through three stages, all of which are depicted as encircled numbers. The critical path (i.e., path 317) is a path that includes a series of processes that must be completed so that memory controller 308 can provide RCB addresses 320 for avoiding page conflicts. As such, the last process (e.g., bank separation by bank separator 314) of the critical path dictates the earliest point in time to form such addresses after address translation begins. As shown in FIG. 3, each of address translator 310, row characterizer 312, and bank separator lies in respective process stages on the critical path and therefore each is critical for timely RCB address 320 generation. So although memory controller 308 removes requisite minimum time, L1, its three-stage critical path nevertheless introduces latency into memory operations.

In view of the foregoing, it would be desirable to provide a system, an apparatus and a method for minimizing the drawbacks of minimizing sequential accesses to the same bank of memory, especially by reducing the time that a RCB address is translated from a linear address.

SUMMARY OF THE INVENTION

A system, apparatus, and method are disclosed for controlling accesses into memory to minimize sequential accesses to the same bank of memory, at least in part, by characterizing a subset of an address in parallel with address translations associated with those accesses. In one embodiment, an exemplary memory controller includes an address translator configured to translate an address useable by a processor to a first memory address. Also, the memory controller includes a bit characterizer configured to characterize a subset of the address as having a value from a range of values, and a bank separator coupled to the address translator and the bit characterizer for receiving a first portion of the first memory address and the value, respectively. Accordingly, the bank separator is configured to differentiate the first portion from a second portion of a second memory address. In another embodiment, the bank separator is configured further to replace the translated bank bits with new bank bits for the first memory address and the second memory address, the new bank bits associating the first memory address and the second memory address to a first bank and a second bank, respectively. In some embodiments, the bit characterizer can characterize the subset at or approximately at the same time that the address translator translates the address. An example of a bit characterizer is a tag characterizer.

In another embodiment, an exemplary computing system has a memory designed to avoid page conflicts. This computing system comprises a processor that is configured to provide a first linear address and a second linear address, the first linear address preceding the second linear address. These addresses can be used to service a first transaction and a second transaction. The computing system also includes a memory configured to access a first memory location identifiable by a first row-column-bank ("RCB") address, which corresponds to the first linear address, and to access a second memory location identifiable by a second RCB address, which corresponds to the second linear address. Further, a memory controller is configured to form a first set of new bank bits for the first RCB address based on a first characterization of the first linear address. Also, the memory can form a second set of new bank bits for the second RCB address based on a second characterization the second linear address. The second set of new bank bits differs from the first set of new bank bits so that the first transaction accesses a first bank and the second transaction accesses a second bank. In some cases, the first characterization and the second characterization are formed in parallel to the translations of the first linear address and the second linear address, respectively. In one embodiment, the first set of new bank bits and the second set of new bank bits reduce page conflicts.

In yet another embodiment of the present invention, an exemplary method for avoiding page conflicts in a memory is disclosed. This method comprises characterizing a subset of a linear address of a transaction to form a characterization, translating the linear address to generate translated bank bits, and generating one or more new bank bits based on the characterization and on one or more of the translated bank bits. As such, the one or more new bank bits cause the transaction to access a bank separate from that accessed by a preceding transaction. In another embodiment, the generation of a row-column-bank ("RCB") address occurs by replacing the translated bank bits with the one or more new bank bits. In yet another embodiment, the characterization is formed in parallel to generation of the translated bank bits.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

Figure 5:
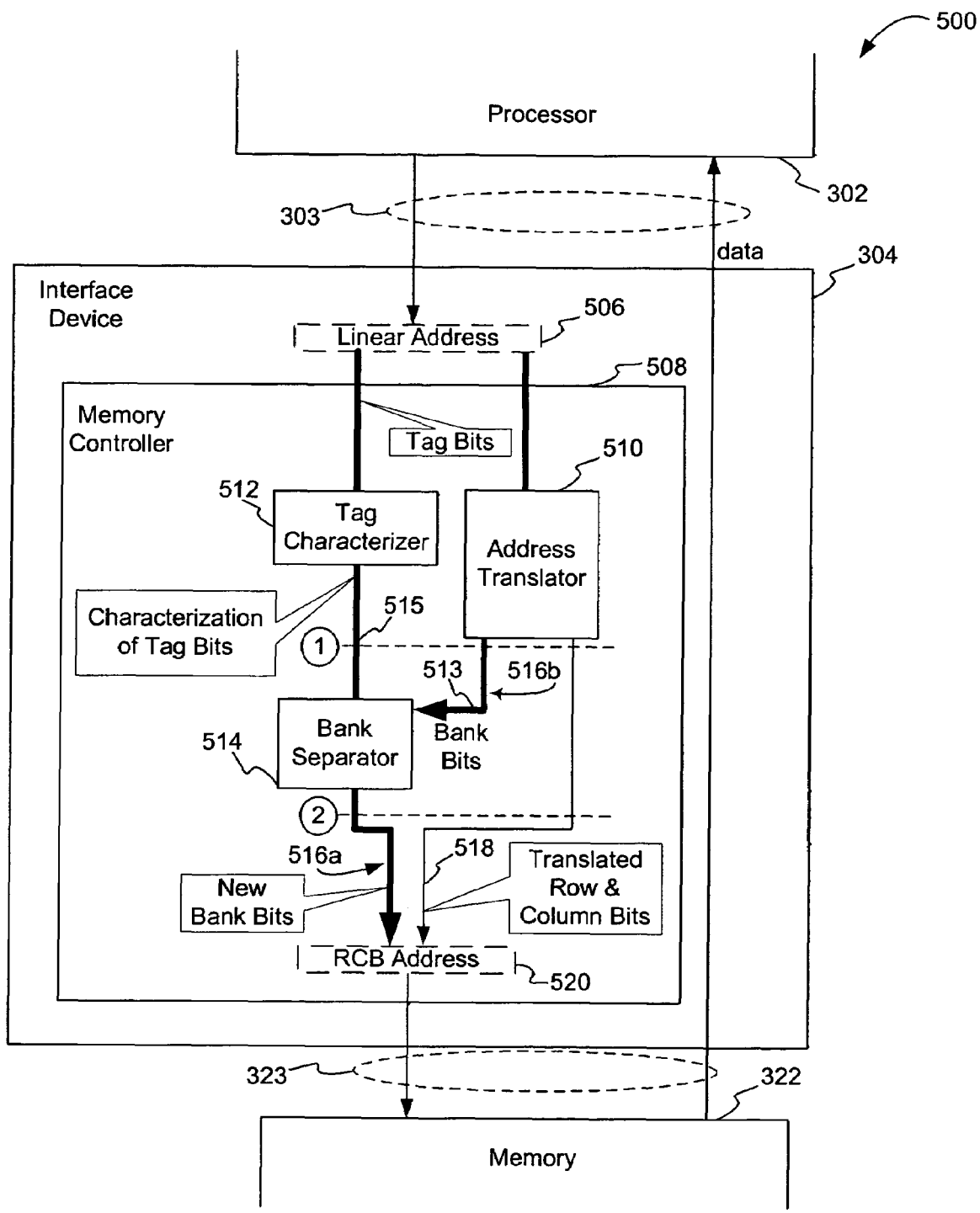
FIG. 5 is a block diagram illustrating an example of a system including a memory controller for characterizing addresses in parallel with translations of memory addresses in accordance with a specific embodiment of the present invention.

FIG. 5 is a block diagram illustrating a system 500 that includes a memory controller 508 for characterizing addresses in parallel with translations of memory addresses in accordance with a specific embodiment of the present invention. In this example, memory controller 508 is disposed within at least one interface device 304 that, in whole or in part, either constitutes a Northbridge "chip" or "chip set," or has an equivalent functionality of a Northbridge device. As such, device 304 is communicatively coupled over at least one bus, such as front side bus 303, to at least one processor 302 and a graphics processor unit ("GPU") (not shown). In some instances, device 304 is communicatively coupled via memory bus 323 to memory 322. During execution of its program instructions, processor 302 provides a linear address 506 to memory controller 508 as part of a processor request requiring access to data in memory 322.

Memory controller 508 includes a tag characterizer 512, an address translator 510 and a bank separator 514, and is configured to convert linear address 506 into an RCB-formatted address, such as RCB address 520. Note that RCB address 520 can have its row, column and bank bits arranged in any order (e.g., from most to least significant bit: row bits, bank bits, column bits). In a specific embodiment of the present invention, tag characterizer 512 is configured to characterize one or more tag bits for one or more linear addresses 506, the one or more tag bits being from a processor-useable address rather than a memory-useable address, such as an RCB address. Importantly, tag characterizer 512 need not depend on translated row bits from either row 204a or row' 204b of RCB address 204, but rather uses tag bits, such as those of 202a bits (FIG. 2), from which to characterize address 506. As such, computational resources that otherwise would be dedicated to translating row bits before characterizing those bits need not be required, according to one embodiment of the present invention.

Conceptually, tag characterizer 512 operates to identify groups of tag bits that are likely to cause page conflicts over sequential accesses to the same bank. In accordance with a specific embodiment of the present invention, tag characterizer 512 examines bits of tag 202a (or a subset thereof) and determines a value 515 as a characterization of those bits. By characterizing each RCB address 520, memory controller 508 can use the characterization to avoid the page conflicts, such as those conflicts commonly occurring when cache lines of a cache are evicted. Specifically, the bits of a tag 202a (or a portion of a tag) can be characterized to indicate whether there is either an increased likelihood or a decreased likelihood that lower order bits 214 (FIG. 2) of one RCB address 520 might be identical to another sequential RCB address 520. If there is an increased likelihood (or a substantial certainty) that lower order bits 214 of one RCB address 520 might be identical to another RCB address, then a first characterization (i.e., a value that characterizes those bits) is then associated with tag 202a. Bank separator 504 uses the first characterization to ensure that sequential accesses (e.g., read and write cycle pairs) are to separate banks. But if there is a decreased likelihood (or a negligible probability) that sequential RCB addresses might relate to the same bank, then tag characterizer 512 associates a second characterization (i.e., another value characterizing those bits) with tag 202a so that bank separator 504 can continue to ensure sequential accesses will relate to different banks. In at least one embodiment, sequential addresses are back-to-back (i.e., consecutive).

Figure 1:
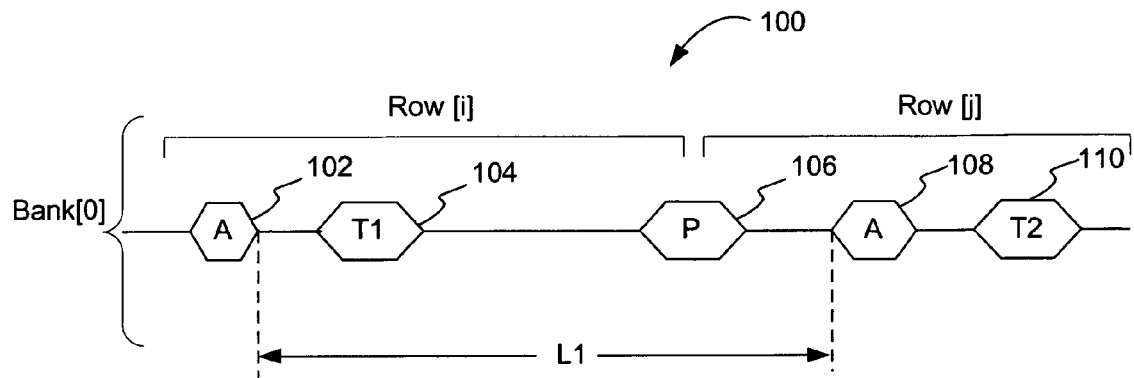
FIG. 1 is a timing diagram showing that a requisite minimum time duration introduces latency between sequential accesses to a single bank common to most conventional memories.
Figure 2:
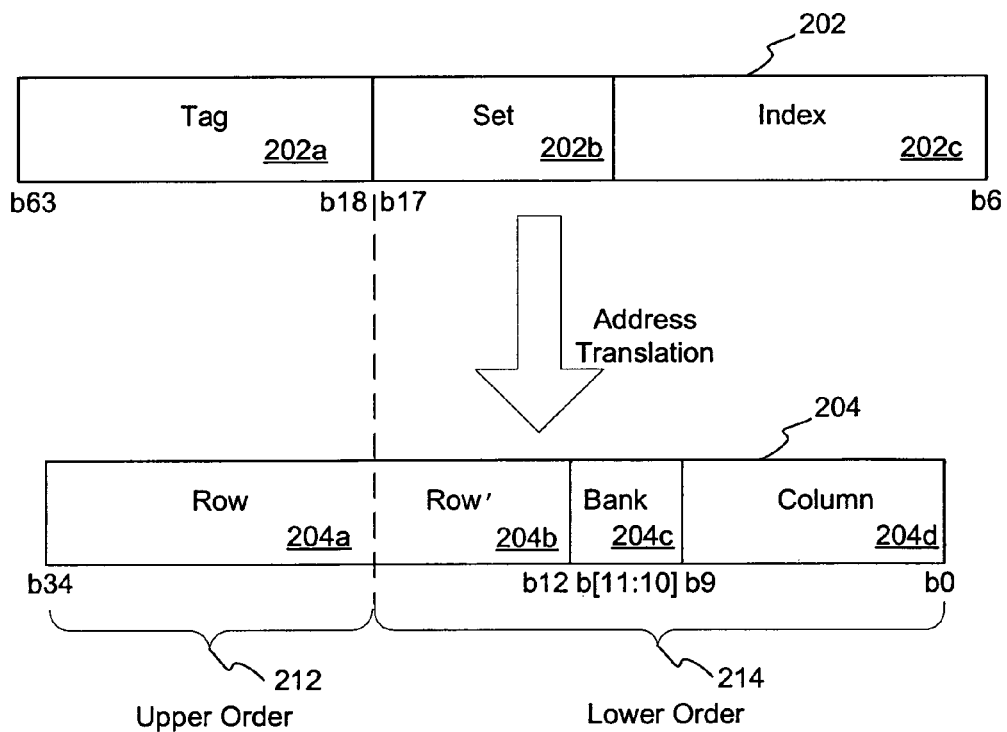
FIG. 2 illustrates that the nature of translating a linear address into a row-column-bank ("RCB") address during which a number of transaction pairs can be generated.
Figure 3:
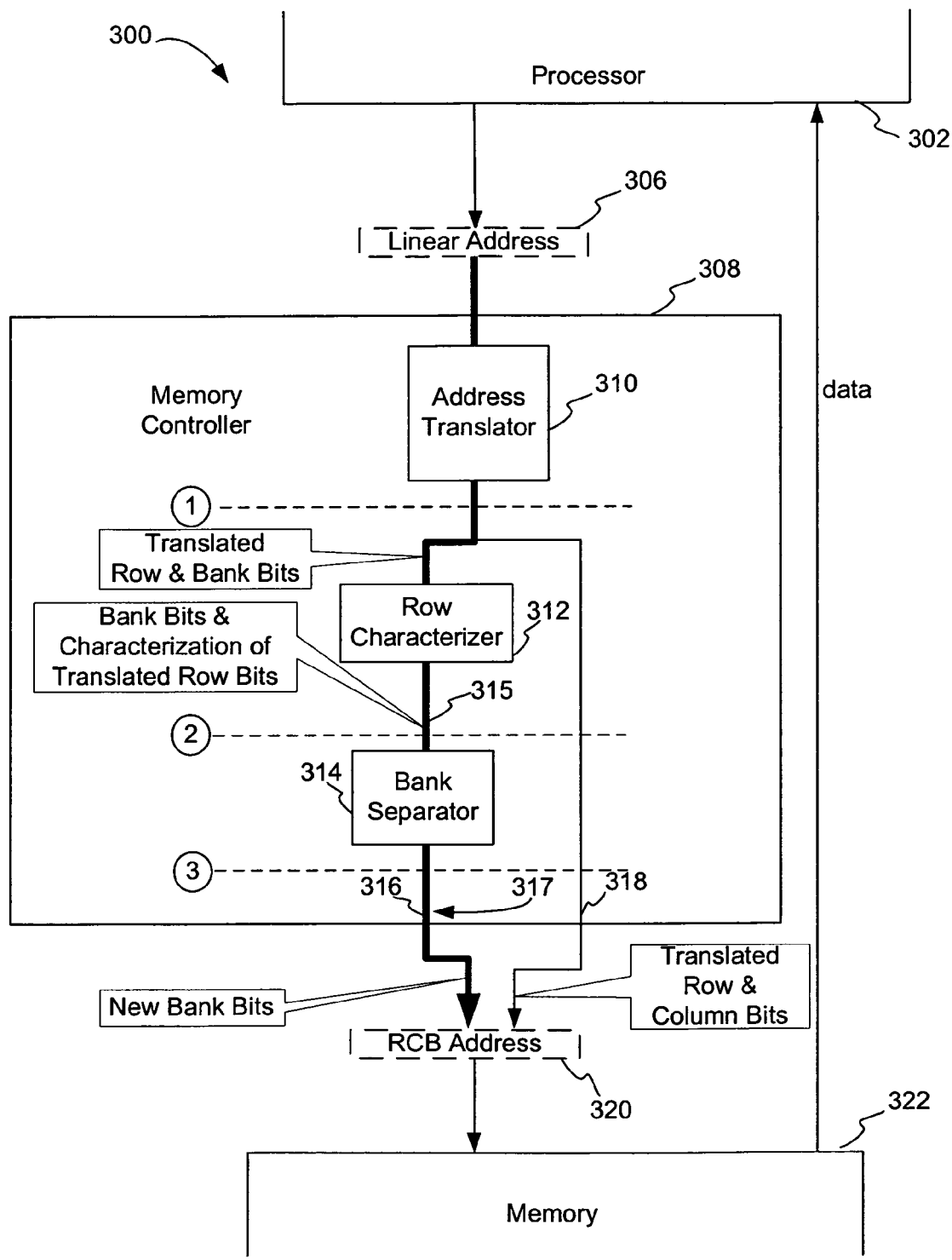
FIG. 3 is a block diagram illustrating an approach to reducing latency due to page conflicts.
Figure 4:
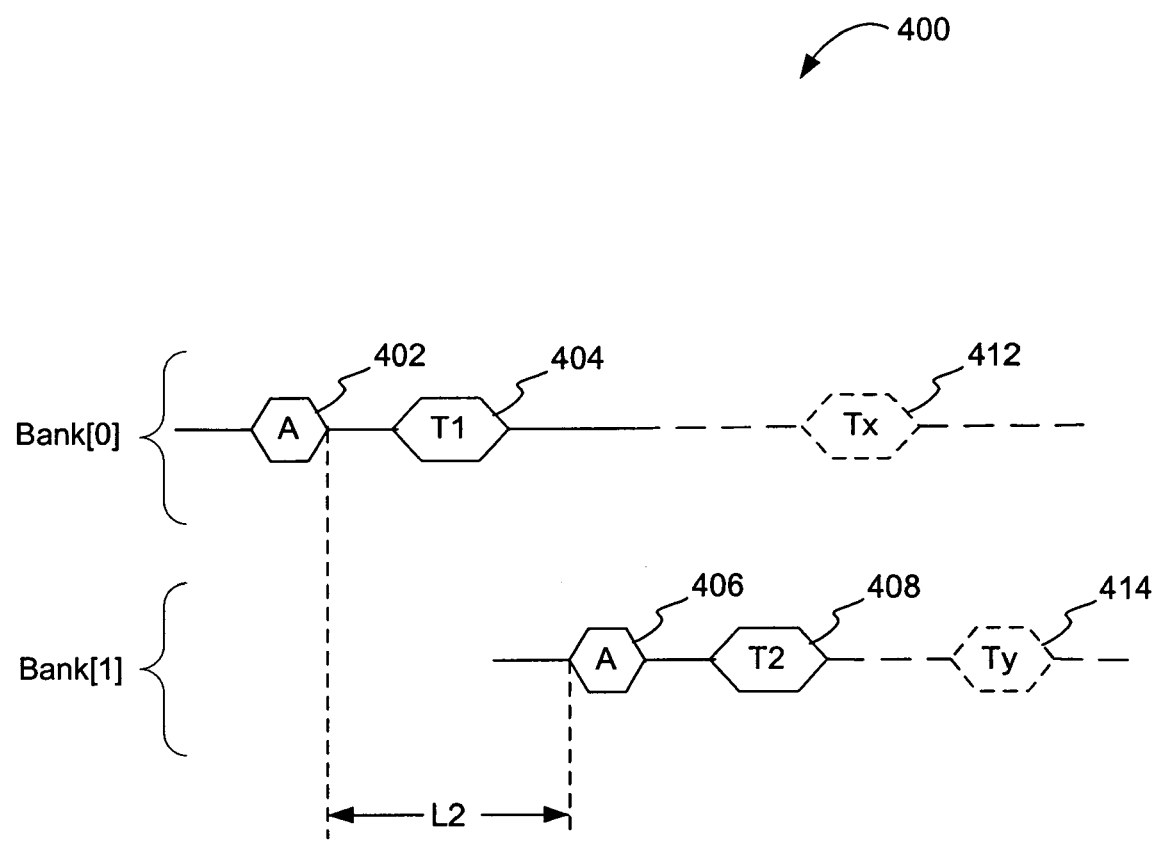
FIG. 4 is a timing diagram showing sequential accesses to different banks as translated by a memory controller.

Because tag characterizer 512 operates on tag bits of linear address 506 rather than upper order bits 212 of a translated address, the functionality of tag characterizer 512 can be performed in parallel to that of address translator 510 without first translating bits of tag 202a into upper order bits 212 (FIG. 2). Hence, tag characterizer 512 can be co-located in the same stage as address translator 510, thereby providing for a "two stage" memory controller 508. FIG. 5 depicts these two stages as encircled numbers "1" and "2," with the critical paths being shown as paths 516a and 516b, both of which are shown as heavy lines. Critical paths 516a and 516b are paths that each includes a series of processes that must be completed so that memory controller 508 can provide RCB addresses 520 for avoiding page conflicts. Regardless of which one of critical paths 516a and 516b may be shorter (i.e., less critical) than the other, both critical paths are individually shorter than that of critical path 317 (FIG. 3).

So according to at least one embodiment of the present invention, critical path 516a includes two process stages—one stage relating to tag characterizer 512 and another stage relating to bank separator 514, whereas critical path 516b includes one stage relating to address translator 510 and another stage relating to bank separator 514. Accordingly, memory controller 508 can characterize tag bits of linear addresses 506 without having to wait for address translator 510 to translate linear addresses 506 into RCB addresses 520 to generate translated row bits for row characterization purposes. One benefit of a two-stage memory controller 508, therefore, is that it can reduce latency by recovering one or more memory controller clock cycles that a three-stage memory controller would otherwise consume. So as address translator 510 generates its outputs, which include new bank bits 513 and translated row and column bits on path 518, tag characterizer 512 can characterize tags 202a (or subsets thereof) of linear addresses 506 for sequential accesses to memory 322 (FIG. 3). Note that translated row and column bits 518 are output from address translator 510 and do not lie on either of critical paths 516a or 516b.

Next, values 515 as characterizations of sequential linear addresses 506 are then provided to bank separator 514. Bank separator 514 generates new bank bits for RCB address 520 based on the characterization of the bits of tag 202a as well as translated bank bits 513 from address translator 510. Thereafter, memory controller 508 forms RCB address 520 by combining (e.g., concatenating) new bank bits output from bank separator 514 and translated row and column bits 518. In one embodiment, the combination of new bank bits on path 516a and translated row and column bits 518 is implemented by replacing the originally translated bank bits with the new bank bits for a first memory address (e.g., a post-translation address) to ensure that the first memory address accesses a separate bank than that of a second memory address (e.g., a subsequent, consecutive post-translation address). The new bank bits for each of the first memory address and the second memory address are configured to be different so as to relate to two separate banks. Consequently, the new bank bits of sequential RCB addresses 520 effectuate sequential accesses to separate banks in memory 322 (FIG. 3) rather than to the same bank, thereby avoiding latency that otherwise would accompany the implementation of a row characterizer in series with the output of an address translator.

Figure 6:
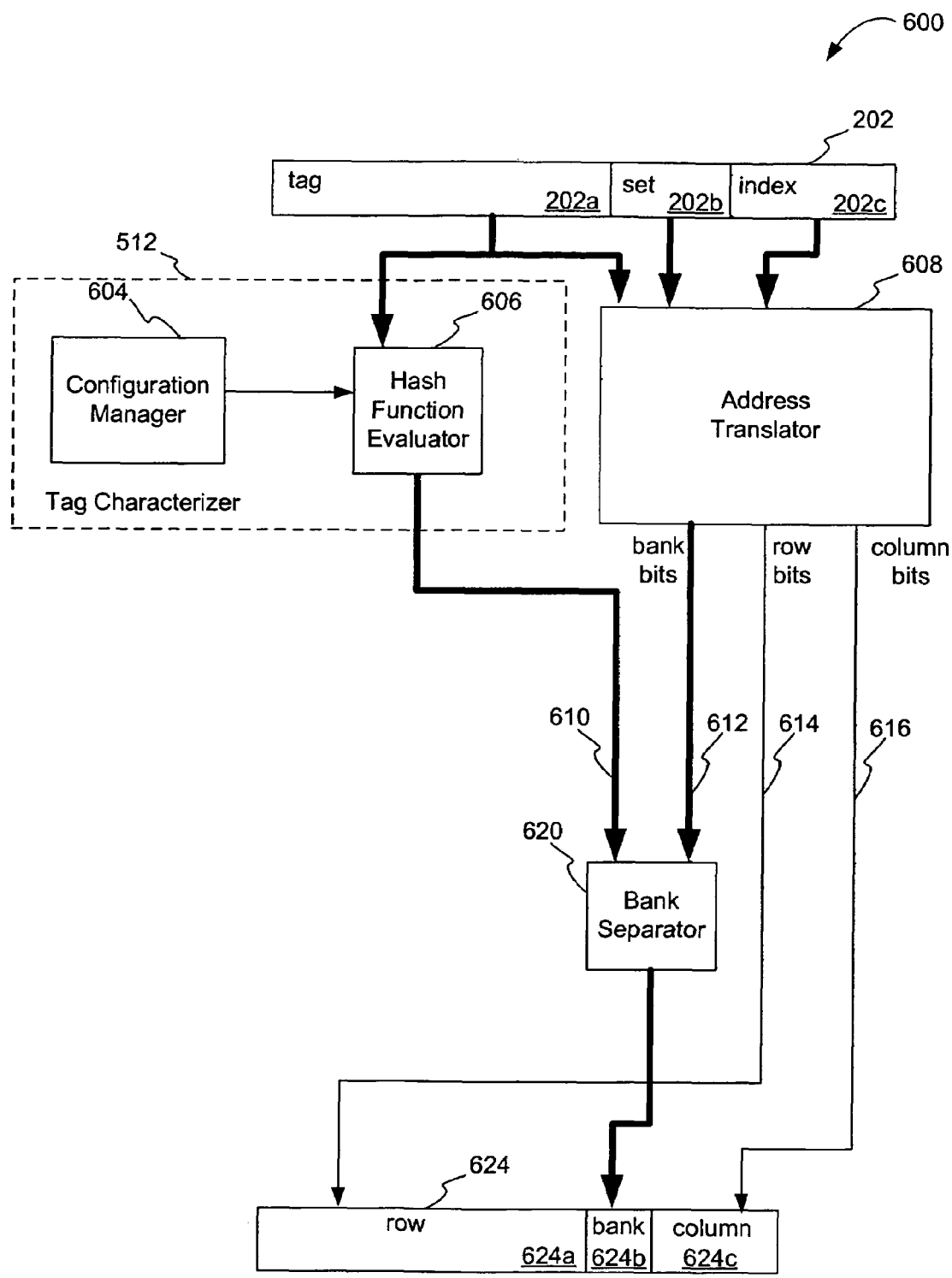
FIG. 6 is a block diagram illustrating an example of a memory controller, according to a specific embodiment of the present invention.

FIG. 6 is a block diagram illustrating an example of memory controller 600, according to a specific embodiment of the present invention, the elements of which can be composed of either hardware or software, or both. In this instance, tag characterizer 512 includes a configuration manager 604 and a hash function evaluator 606. Configuration manager 604 operates to determine processor-dependent information for characterizing some or all bits of linear address 202 (e.g., the type of processor 302, the number of bits in linear address 202, the processor-cache structure, the bits that constitute the size of tag 202a, etc.). Further, configuration manager 604 selects one or more masks that when applied against tag 202a will segregate bits that are sufficient to characterize the tag bits of linear address 202. The bits of the masks that optimally segregate the tag bits of tag 202a can be determined empirically by observing, for example, linear addresses 202 that tend to lead to page conflicts, and then creating a mask for identifying the groups of tag bits that are likely to cause page conflicts. Generally, the contents of these masks depend on the type of processor 302 interfacing memory controller 600. In one embodiment of the present invention, configuration manager 604 provides one or more masks for each type of transaction. In at least one case, configuration manager 604 provides a mask for each bank bit of the RCB address output from address translator 608 regardless of whether that RCB address relates to a read transaction, a write transaction, or any other kind of transaction. For instance, if there are three bank bits, then there can be three masks.

Hash function evaluator 606 uses the one or more masks to mask (or segregate) certain tag bits, and then applies those segregated bits to a hash function. In turn, the hash function derives a value with which to associate a first subset of tag bits of tag 202a. This value is a characteristic with which to distinguish this first subset from other values of other tags 202a for other addresses. After evaluating the tag bits and generating a value, hash function evaluator 606 passes that value to bank separator 620. In one embodiment, any linear address 202 is characterized by only one of two values—logical zero or one. Note also that the determination of these values lies on critical path 610 (i.e., the path passing through both stages of the two-stage memory controller 600).

Although address translator 608 is configured to decode any linear address format, FIG. 6 shows the translation of linear address 202 having a form of tag 202a, set 202b, and index 202c. Further, address translator 608 can decode linear addresses into row-column-bank formatted addresses at or near the same time as configuration manager 604 and/or hash function evaluator 606 determine a value. As shown, address translator 608 provides at least one translated bank bit on another critical path 612 to bank separator 620. Memory controller 608 uses row bits 614 and column bits 616 to form row 624a and column 624c, respectively, of RCB address 624.

Bank separator 620 receives the at least one translated bank bit from critical path 612 and a corresponding value from hash function evaluator 606. Then, it generates a new bank bit to replace a corresponding bank bit generated by address translator 608. For example, if bank 624b requires two bank bits, BB[0] and BB[1], then hash function evaluator 606 operates to evaluate tag bits of tag 202a against a corresponding mask. From this evaluation, hash function evaluator 606 provides a value for each translated bank bit from critical path 612. Consequently, bank separator 620 will generate two new bank bits for insertion into bank 624b.

Figure 7:
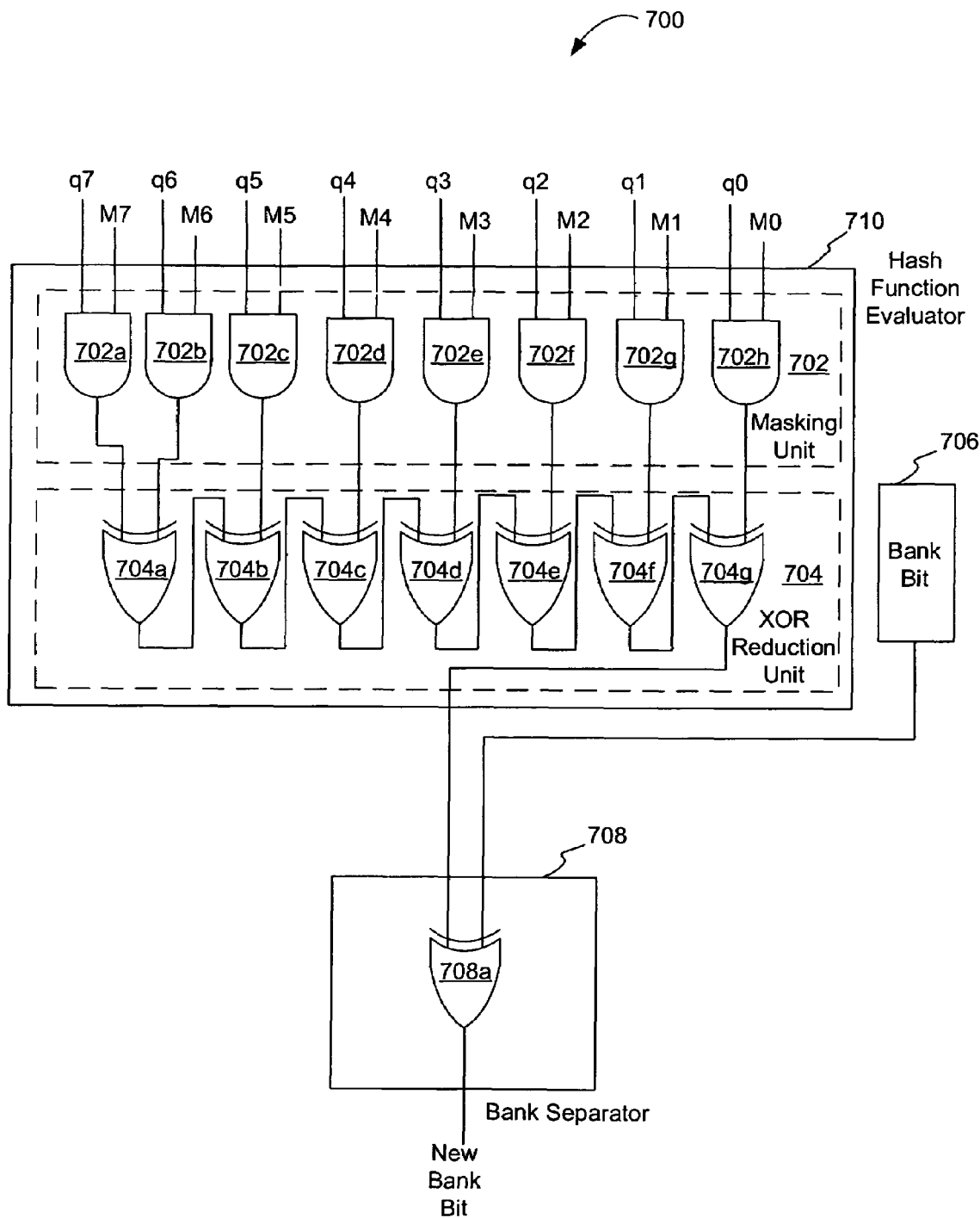
FIG. 7 is a conceptual representation showing a specific exemplary implementation of a hash function evaluator and a bank separator in accordance with one embodiment of the present invention.

FIG. 7 is a conceptual representation 700 of exemplary implementations of both hash function evaluator 710 and bank separator 708 in accordance with one embodiment of the present invention. Hash function evaluator 710 is composed of a masking unit 702 and a logical exclusive-OR ("XOR") reduction unit 704. Conceptually, a number of logical AND elements 702a to 702h, which can be AND gates, constitute masking unit 702. Mask bits M0 to M7 are applied to one input of each logical AND element, and corresponding tag bits q0 to q7 are applied to the other input of logical AND elements 702a to 702h. As an output, masking unit 702 provides the masked bits to inputs of XOR reduction unit 704. Note that hash function evaluator 710 can receive any number of mask bits and/or tag bits, and need not be limited to the bit quantities represented in FIG. 6. In one embodiment, bits [24:17] of a linear address constitute the subset of tag bits input as bits q0 to q7 into hash function evaluator 710.

XOR reduction unit 704 is composed of another number of XOR elements 704a to 704g. XOR element 704a receives outputs from logical AND elements 702a and 702b and generates an output, which is in turn input into XOR element 704b along with the output of logical AND element 702c. The other XOR elements 704c to 704g are similarly configured. XOR element 704g provides a "value" to an input of bank separator 708. The "value" characterizes tag bits q0 to q7, which in turn characterizes a related linear address. In this instance, bank separator 708 is composed of an XOR element 708a, one input being configured to receive the output of hash function evaluator 710 and another input being configured to receive one of a number of translated bank bits 706. Bank separator 708 generates a new bank bit for each corresponding translated bank bit 706 derived from address translator 608.

Figure 8:
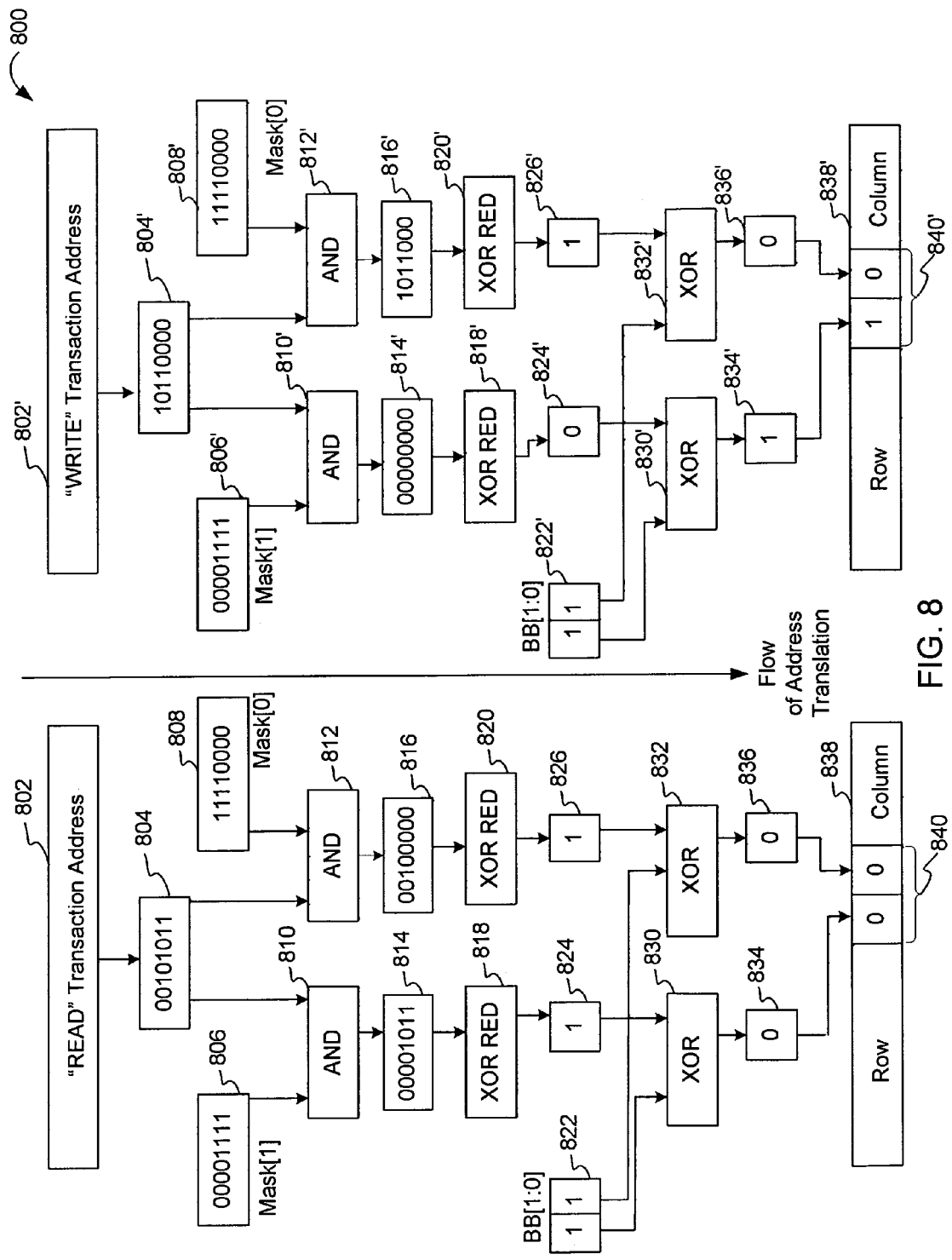
FIG. 8 illustrates a functional flow diagram in accordance with a specific embodiment of the present invention.

FIG. 8 illustrates a functional flow diagram 800 in accordance with one embodiment of the present invention. This figure depicts flow elements for a "flow of address translation" during which a "read" transaction address 802 and a "write" transaction address 802' are respectively translated into a first RCB address 838 and a second RBC address 838'. Although the following discussion describes read transaction address 802 being converted from a linear address into RCB address 838, note that the flow elements translating write transaction address 802' are equivalent in nature to those of read transaction address 802, and therefore, need not be described in detail.

First, memory controller of a specific embodiment extracts tag bits 804 (or a subset thereof), such as bits "00101011," to form a first RBC address 838 that includes two new bank bits 840. The two translated bank bits ("BB[1:0]") 822 are initially translated by an address translator. For each of translated bank bits 822, a mask is applied against tag bits 804. Both tag bits 804 and mask[0] 808 ("11110000"), which corresponds to BB[0] 822, are input into an AND operation 812 to generate masked (or segregated) bits 816. Then, masked bits 816 are input into an XOR reduction unit ("XOR RED") 820 to generate a value 826, which is a logical one. Flow elements 810 to 824 each perform similar operations, but uses mask[1] 806 ("00001111").

Next, both BB[1], which is a logical one, and value 824 are input into XOR operation 830. Also, BB[0], which is also logical one, is input along with value 826 into XOR operation 832. Respectively, XOR operation 830 and XOR operation 832 yield new bank bit one 834 (i.e., new BB[1]) and new bank bit zero 836 (i.e., new BB[6]). So as shown in FIG. 8, logical zeroes for both new BB[1] 834 and new BB[0] 836 are inserted into bank portion 840 of RCB address 838.

In similar fashion, write transaction address 802' is translated into RBC address 838' by way of flow elements that are enumerated with apostrophes, those elements having similar functionality and/or structure to those described above. But although write transaction address 802' initially has the same translated bank bits 822' as translated bank bits 822 of read transaction address 802, new bank bits 840' are different than new bank bits 840. As such, the read and write transactions will be transacted in relation to different banks, thereby avoiding a page conflict.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A memory controller for performing row-column-bank ("RCB") address translation to avoid page conflicts comprising:
   an address translator configured to translate a linear address useable by a processor into a first memory address;
   a tag characterizer acting in parallel with said address translator to characterize said linear address, said tag characterizer configured to examine tag bits of a tag portion of said linear address to generate a characterization of the tag bits indicative of the likelihood of a page conflict with a second memory address; and
   a bank separator coupled to said address translator and said tag characterizer, the bank separator in response to determining that said characterization is indicative of a potential page conflict for a sequential memory access generating new bank bits for the first memory address to avoid the page conflict with the second memory address.

2. The memory controller of claim 1 wherein said bank separator is configured further to differentiate said first portion from said second portion so that said first portion relates to a first bank and said portion relates to a second bank.

3. The memory controller of claim 2 wherein said bank separator relates said first portion to said first bank and relates said second portion to said second bank by replacing translated bank bits of first and second portions with new bank bits for said first memory address and said second memory address.

4. The memory controller of claim 1 wherein said value of said subset is used to determine whether a page conflict is likely between said first and said second memory addresses.

5. The memory controller of claim 4 wherein said value of said subset is indicative of either
   an increased likelihood of said page conflict if said value is equivalent to a first value, or
   a decreased likelihood of said page conflict if said value is equivalent to a second value.

6. The memory controller of claim 1 further comprising:
   a configuration manager configured to provide information for selecting segregated bits from said subset from said address; and
   a hash function evaluator configured to determine said value based on said subset.

7. The memory controller of claim 6 wherein said information constitutes at least one mask and said segregated bits are masked bits that are formed after said at least one mask is applied to said subset of said address.

8. The memory controller of claim 7 wherein said hash function evaluator further comprises:
   logic configured to form said masked bits based on said information and said subset; and
   logic configured to form said value based on said masked bits.

9. The memory controller of claim 1 wherein said bank separator further comprises logic to form one or more new bank bits based on said first portion and said value.

10. The memory controller of claim 9 wherein said address is a linear address and said first memory address and second memory address are row-column-bank ("RCB") formatted addresses having said new bank bits being located between row bits and column bits, said second memory address being consecutive to said first memory address.

11. A computing system having memory designed to avoid page conflicts comprising:
   a processor configured to provide a first linear address and a second linear address for servicing a first transaction and a second transaction, respectively, said first linear address preceding said second linear address;
   a memory configured to access a first memory location identifiable by a first row-column-bank ("RCB") address corresponding to said first linear address and to access a second memory location identifiable by a second RCB address corresponding to said second linear address; and
   a memory controller configured to form a first set of new bank bits for said first RCB address based on a first characterization of said first linear address and to form a second set of new bank bits for said second RCB address based on a second characterization said second linear address, said second set of new bank bits differing from said first set of new bank bits so that said first transaction accesses a first bank and said second transaction accesses a second bank;
   the memory controller including an address translator configured to translate a linear address useable by a processor into a first memory address, a tag characterizer acting in parallel with said address translator to characterize said linear address, said tag characterizer configured to examine tag bits of a tag portion of said address to generate a characterization of the tag bits indicative of the likelihood of a page conflict with a second memory address, and a bank separator coupled to said address translator and said tag characterizer, the bank separator in response to determining that said characterization is indicative of a potential page conflict for a sequential memory access generating new bank bits for the first memory address to avoid the page conflict with the second memory address;

wherein said first characterization and said second characterization are formed in parallel to the translation of said first linear address and said second linear address, respectively.

12. The computing system of claim 11 wherein said first set of new bank bits and said second set of new bank bits reduce page conflicts.

13. The computing system of claim 11 further comprising:

a front side bus coupling said processor to said memory controller and configured to sequentially communicate said first linear addresses and said second linear address, each of which include an identical subset of bits that is indicative of a common bank to which said first linear address and said second linear address relate; and a memory bus coupling said memory controller to said memory and configured to communicate said first RCB address including said first set of new bank bits and said second RCB address including said second set of new bank bits.

14. The computing system of claim 13 wherein said identical subset of bits includes low order bits that are the same for each of said first linear address and said second linear address, said first linear addresses and said second linear address each also including another subset of bits that are high order bits that are different, said first transaction and said second transaction being consecutive transactions.

15. The computing system of claim 11 wherein said first transaction is a read transaction and said second transaction is a write transaction, said second transaction being consecutive with said read transaction.

16. The computing system of claim 15 wherein at least one subsequent read transaction accesses said first bank and at least one subsequent write transaction accesses said second bank, thereby avoiding a precharge operation.

* * * * *